No. 813,684. PATENTED FEB. 27, 1906.
T. G. ALLEN.
MOTOR CAR FOR PREVENTING SIDE SLIP.
APPLICATION FILED JAN. 6, 1905.
2 SHEETS—SHEET 1.
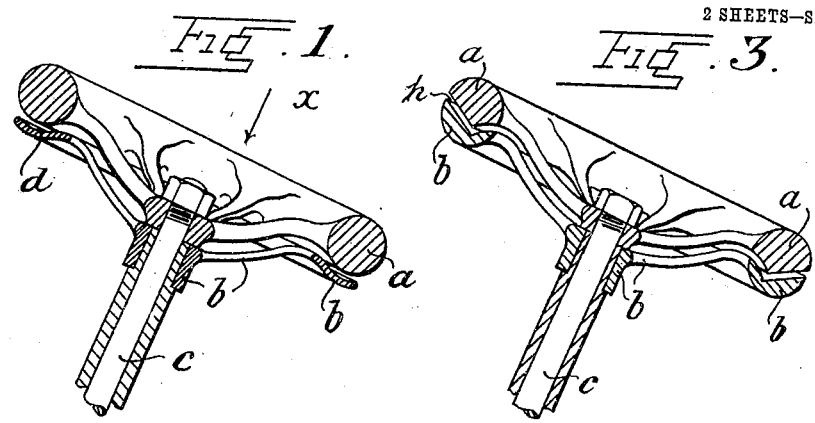
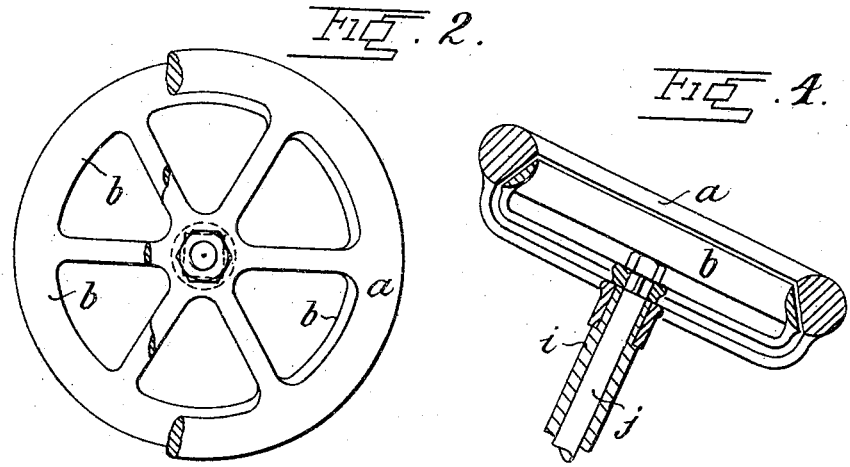
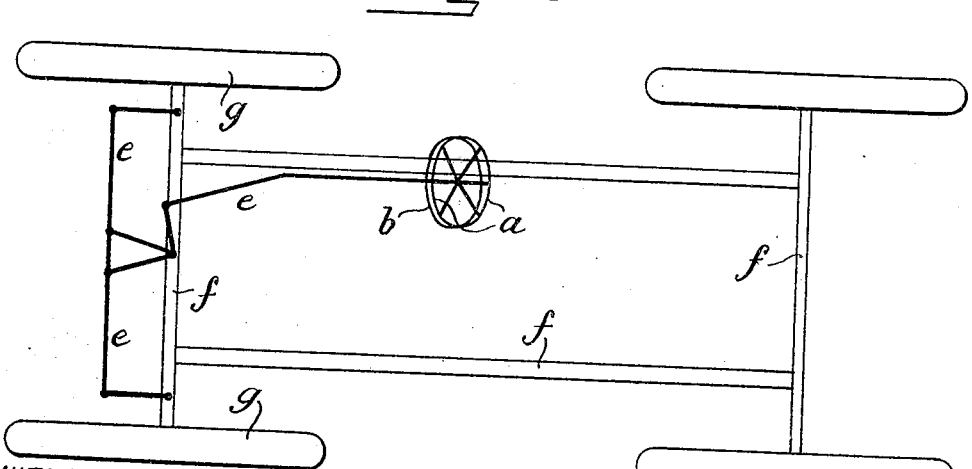
WITNESSES
Fred White
René Nuine
INVENTOR:
Thomas Gaskell Allen
By his Attorneys
Arthur E. Fraser

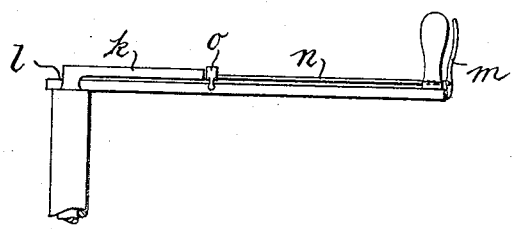
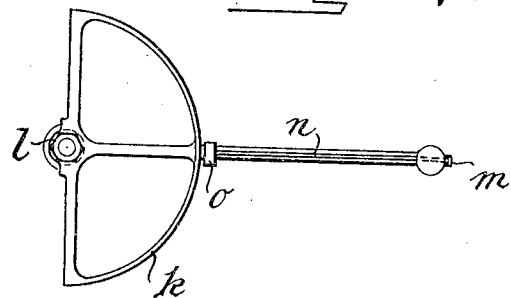

UNITED STATES PATENT OFFICE.

THOMAS GASKELL ALLEN, OF LONDON, ENGLAND.

MOTOR-CAR FOR PREVENTING SIDE SLIP.

No. 813,684.            Specification of Letters Patent.            Patented Feb. 27, 1906.

Application filed January 6, 1905. Serial No. 239,859.

*To all whom it may concern:*

Be it known that I, THOMAS GASKELL ALLEN, engineer, a citizen of the United States of America, residing at 39 Victoria street, Westminster, London, England, have invented certain new and useful Improvements in or Relating to Motor Cars and Cycles for the Prevention of Side Slip, of which the following is a specification.

This invention relates to motor cars and cycles, but particularly to motor-cars, and has for its object to provide means whereby the liability of side slip is reduced to a minimum or obviated.

According to this invention I combine with the steering-gear means whereby the said steering wheel or gear which it operates can be temporarily and quickly locked to the car-body or released therefrom while the vehicle is in motion. By this means the driver of the car will, directly side slip occurs or tends to occur, cause his steering wheel or apparatus to be locked to the body of the car, and so keep the front and rear wheels of the car locked in respect to one another. When the car is thus made a rigid whole and the relative position of the front and rear wheels is prevented from changing, the path of least resistance will be in the direction in which the steering-wheels happen to be guiding the car at the time, and the car will therefore continue in its proper course. The means for locking will be such that it may be instantly released for the purpose of steering directly the tendency to side slip has been obviated or arrested.

I have illustrated some forms of my invention in the accompanying drawings, wherein—

Figure 1 is a vertical section of a steering-wheel having my invention applied thereto. Fig. 2 is a plan of Fig. 1 looking in the direction of the arrow $x$ with part of the steering-wheel removed to show the disk beneath on the left-hand side of the figure. Figs. 3 and 4 are similar views to Fig. 1, showing modifications. Fig. 5 is a diagrammatic plan of a motor-car, illustrating the operation of the invention. Figs. 6 and 7 are respectively side elevation and plan, showing the invention applied to a different type of steering-handle.

In Figs. 1 and 2, $a$ is the steering-wheel, and the locking means comprises a disk or wheel $b$, fixed to the stationary sleeve or tube in which the rotary steering-pillar $c$ turns. The said fixed disk $b$ is disposed in close proximity to the steering-wheel $a$, and its rim $d$ is of channeled section, following the contour of the steering-wheel $a$ and fitting close under or to one side of the circular rim thereof, so that the driver may with convenience either turn the steering-wheel $a$ freely for the purpose of steering or firmly grip the steering-wheel, together with the disk $b$, and so hold the steering-wheel $a$ fast to the body of the car should side slip be rendered likely. This operation or the effect thereof will be clearly seen on reference to Fig. 5, where $a$ and $b$ are the respective steering-wheel and disk, which when held fast together by the grip of the driver's hands, will practically lock the steering-gear $e$ to the body of the car $f$, and consequently the movement of the body of the car $f$ independently of the front or guiding-wheels $g\,g$ will be prevented, and the car will continue in the direction in which the locked wheels $g\,g$ are guiding at the moment when the steering-wheel $a$ and rim $d$ are gripped, as described, by the driver.

As shown in Fig. 3, the rim of the wheel $a$ and the rim of the disk $b$ may be of such section that they together form a circular rim divided, as at $h$, the part constituting the rim $d$ being disposed at the most convenient part of the rim for being gripped by the thumb of the driver.

In some cases, as shown in Fig. 4, where the steering-wheel $a$ rotates a tubular sleeve or shaft, such as $i$, on a fixed internal shaft $j$, a construction similar to that shown in Fig. 3 may be followed with the exception that the fixed disk $b$ will be disposed inside the rim $a$, the supporting parts or spokes of both being preferably recessed, as shown, to render operation by the hands convenient.

In the case of a pivoted-lever steering-handle the part to be gripped will follow the line along which the hand moves when steering, or the construction shown in Figs. 6 and 7 may be adopted, where to economize space the part to be gripped is constituted by a curved guide $k$, disposed somewhere between the handle and the turning-point $l$, the locking effect being obtained by a small spring-pressed lever $m$, mounted on the handle and adapted, through a rod $n$, to operate a gripping-brake device $o$, which locks the handle to the guide $k$ when pressed thereon by the lever $m$. The said locking effect may be obtained by various modifications—for instance, it may be obtained by a lever arrangement similar to a bicycle-brake either acting by friction or direct engagement with the sleeve of the steering-pillar, the bearing thereof or other parts of the car or a band brake may be adopted.

If required, the locking effect may be obtained independently of the steering wheel or handle, and it may be operated from either the steering-gear against the car-body or from the car-body against the steering-gear. It may also be operated by the hand, the foot, or the knee.

What I claim, and desire to secure by Letters Patent, is—

1. In a motor road-vehicle, a means for preventing unintentional operation of the steering-wheels during side slip, or the like, by utilizing the natural grasp of the operator to lock said steering-wheels relatively to the vehicle-body, comprising a steering mechanism, a steering-handle connected thereto, said parts being normally free to operate to turn said wheels, and a member arranged in a position sufficiently close to said handle to permit both to be grasped by the same hand, said member being so mounted that it is rigidly connected to the vehicle-body when said handle and member are forcibly clasped by the hand.

2. In a motor-road vehicle, a steering mechanism, a locking member non-rotatively connected to the vehicle, a steering-handle connected to said mechanism, means for mounting said handle so that it has a definite path of movement with relation to said member, said handle and member being mounted closely adjacent to each other, and being adapted to be grasped by the hand of the operator, so as to lock said handle against movement relatively to said member.

3. For preventing side slip in motor road-vehicles the combination with the steering-handle of means fixed to the other part of the vehicle in which the handle turns, and so disposed in regard to the steering-handle that the driver may grip both the said fixed means and the steering-handle in one hand at one time and so lock the same together as and when required while the vehicle is in motion.

4. In a motor road-vehicle, a steering mechanism, a steering-wheel connected thereto, and a disk non-rotatively connected to the vehicle in substantially concentric relation to the steering-wheel, said disk and wheel being closely adjacent to each other so both may be grasped by one hand of the operator.

5. For preventing side slip in motor road-vehicles the combination of a steering-wheel, a steering-shaft operated by said wheel, a fixed part in which said steering-shaft turns, a disk fixed to the said fixed part just beneath the steering-wheel, the said disk being such that the driver can grip the same and hold the steering-wheel fast thereto or turn the steering-wheel freely as and when required while the vehicle is in motion.

6. In a motor road-vehicle, a steering mechanism, a steering-wheel, a disk mounted closely adjacent to said steering-wheel in substantially concentric relation thereto, a tube, and a post within said tube, the one being non-rotatively mounted with relation to the vehicle, and carrying said disk, and the other being connected to the steering mechanism and carrying said wheel.

In witness whereof I have hereunto signed my name in the presence of two subscribing witnesses.

THOMAS GASKELL ALLEN.

Witnesses:
ROBERT M. SPEARPOINT,
H. D. JAMESON.